(12) United States Patent
Suehiro et al.

(10) Patent No.: US 10,050,262 B2
(45) Date of Patent: Aug. 14, 2018

(54) NEGATIVE ELECTRODE FOR NONAQUEOUS ELECTROLYTE SECONDARY BATTERY, AND NON-AQUEOUS ELECTROLYTE SECONDARY BATTERY USING THE SAME

(71) Applicant: PANASONIC CORPORATION, Osaka (JP)

(72) Inventors: Yuki Suehiro, Hyogo (JP); Taisuke Yamamoto, Nara (JP); Tatsuki Hiraoka, Hyogo (JP); Katsumi Kashiwagi, Nara (JP)

(73) Assignee: PANASONIC INTELLECTUAL PROPERTY MANGEMENT CO., LTD., Osaka (JP)

( * ) Notice: Subject to any disclaimer, the term of this patent is extended or adjusted under 35 U.S.C. 154(b) by 141 days.

(21) Appl. No.: 14/361,266

(22) PCT Filed: Dec. 28, 2012

(86) PCT No.: PCT/JP2012/008419
§ 371 (c)(1),
(2) Date: May 28, 2014

(87) PCT Pub. No.: WO2013/099278
PCT Pub. Date: Jul. 4, 2013

(65) Prior Publication Data
US 2014/0356723 A1  Dec. 4, 2014

(30) Foreign Application Priority Data

Dec. 28, 2011 (JP) .................................. 2011-288465

(51) Int. Cl.
*H01M 4/36* (2006.01)
*H01M 4/133* (2010.01)
(Continued)

(52) U.S. Cl.
CPC ........... *H01M 4/364* (2013.01); *H01M 4/131* (2013.01); *H01M 4/133* (2013.01); *H01M 4/134* (2013.01);
(Continued)

(58) Field of Classification Search
CPC ....... H01M 10/0525; H01M 2004/027; H01M 4/133; H01M 4/134; H01M 4/364; H01M 4/483; H01M 4/485
(Continued)

(56) References Cited

U.S. PATENT DOCUMENTS 6,093,503 A * 7/2000 Isoyama ............. H01M 2/1094
429/121
2004/0234859 A1  11/2004 Lee et al.
(Continued)

FOREIGN PATENT DOCUMENTS

JP   10-334921 A   12/1998
JP   2002-313321 A   10/2002
(Continued)

OTHER PUBLICATIONS

STIC results by J. Leh.*
(Continued)

*Primary Examiner* — Miriam Stagg
*Assistant Examiner* — Victoria H Lynch
(74) *Attorney, Agent, or Firm* — McDermott Will & Emery LLP

(57) ABSTRACT

Provided is a negative electrode for a non-aqueous electrolyte secondary battery, capable of improving the energy density and the cycle characteristics of the battery without lowering the initial charge/discharge efficiency of the battery. This negative electrode includes a negative electrode active material including a silicon oxide represented by $SiO_x$ and carbon material. A proportion of a mass of the silicon (Continued)

oxide relative to a total mass of the silicon oxide and the carbon material: y satisfies $0.03 \leq y \leq 0.3$. A difference between a theoretical capacity density of the negative electrode active material and a charge capacity density of the negative electrode active material when a cutoff voltage is 5 mV relative to lithium metal: $\Delta C$ (mAhg$^{-1}$) satisfies $L = \Delta C/100$ and $6y \leq L \leq 12y + 0.2$.

6 Claims, 4 Drawing Sheets

(51) Int. Cl.
 *H01M 4/48* (2010.01)
 *H01M 4/587* (2010.01)
 *H01M 4/131* (2010.01)
 *H01M 4/134* (2010.01)
 *H01M 4/485* (2010.01)
 *H01M 10/0525* (2010.01)
 *H01M 4/02* (2006.01)

(52) U.S. Cl.
 CPC ............. *H01M 4/48* (2013.01); *H01M 4/483* (2013.01); *H01M 4/485* (2013.01); *H01M 4/587* (2013.01); *H01M 10/0525* (2013.01); *H01M 2004/027* (2013.01); *Y02T 10/7011* (2013.01)

(58) Field of Classification Search
 USPC ...................................................... 429/231.4
 See application file for complete search history.

(56) References Cited

U.S. PATENT DOCUMENTS

| | | | | |
|---|---|---|---|---|
| 2005/0191547 A1* | 9/2005 | Konishiike | ......... | H01M 2/0222 429/137 |
| 2007/0190416 A1* | 8/2007 | Yamada | ................. | H01M 4/134 429/218.1 |
| 2010/0151329 A1* | 6/2010 | Sato | ..................... | H01M 4/1395 429/231.95 |
| 2011/0111297 A1* | 5/2011 | Sato | ........................ | H01M 2/16 429/220 |
| 2012/0218683 A1* | 8/2012 | Kondou | ................. | H01G 11/06 361/527 |
| 2013/0337314 A1* | 12/2013 | Essaki | ................... | H01M 4/134 429/163 |
| 2014/0050983 A1* | 2/2014 | Kim | ....................... | H01M 4/133 429/213 |
| 2014/0272597 A1* | 9/2014 | Mikhaylik | .......... | H01M 4/0402 429/233 |

FOREIGN PATENT DOCUMENTS

| | | | | | |
|---|---|---|---|---|---|
| JP | 2004-349253 | A | | 12/2004 | |
| JP | 2005-123175 | A | | 5/2005 | |
| JP | 2007-242590 | A | | 9/2007 | |
| JP | 2008186732 | A | * | 8/2008 | |
| JP | 2009-076372 | A | | 4/2009 | |
| JP | 2009076372 | A | * | 4/2009 | ............ H01M 4/133 |
| JP | 2009-252705 | A | | 10/2009 | |
| JP | 2010-118330 | A | | 5/2010 | |
| JP | 2011-113863 | A | | 6/2011 | |
| JP | WO 2013099267 | A1 | * | 7/2013 | ............ H01M 4/133 |
| WO | 2005/031898 | A1 | | 4/2005 | |

OTHER PUBLICATIONS

Translation of JP2008-186732.*
Machine Translation WO2013099267.*
Machine Translation JP2009076372A (Year: 2009).*
International Search Report issued in International Application No. PCT/JP2012/008419 dated Feb. 26, 2013, with English Translation.

* cited by examiner

NEGATIVE ELECTRODE FOR NONAQUEOUS ELECTROLYTE SECONDARY BATTERY, AND NON-AQUEOUS ELECTROLYTE SECONDARY BATTERY USING THE SAME

RELATED APPLICATIONS

This application is a national phase of International Application No. PCT/JP2012/008419, filed on Dec. 28, 2012, which in turn claims the benefit of Japanese Application No. 2011-288465, filed on Dec. 28, 2011, the disclosures of which Applications are incorporated by reference herein.

TECHNICAL FIELD

The invention relates to a non-aqueous electrolyte secondary battery, and particularly to an improvement of a negative electrode for a non-aqueous electrolyte secondary battery.

BACKGROUND ART

Recently, electronic devices have become rapidly portable and cordless, and there is an increased demand for secondary batteries that are small, light-weight, and have high energy density, as the power source for driving such devices. Also, in addition to secondary batteries for use in small consumer products, technology is quickly being deployed for large secondary batteries for use in, for example, power storage devices and electric-powered vehicles that are required to be durable and safe for a long period of time.

Among secondary batteries, non-aqueous electrolyte secondary batteries, particularly lithium secondary batteries, are highly expected as the power source for small consumer products, power storage devices, and electric-powered vehicles, due to their high voltage and high energy density.

While higher energy density is required of lithium secondary batteries, a material containing an element such as Si, Sn, or Ge capable of alloying with lithium (i.e., material such as an oxide or alloy of the element) is highly expected to be utilized as a negative electrode active material with a high theoretical capacity density. Particularly, Si and Si oxides are studied extensively due to their low cost.

However, regarding a material containing an element capable of alloying with lithium, its crystal structure changes during lithium absorption, which causes its volume to increase. If the volume of the negative electrode active material greatly expands during charge, electrical contact between the negative electrode active material and the negative electrode current collector becomes poor, which causes the charge/discharge cycle life to become shorter. Moreover, a material containing an element capable of alloying with lithium has a large irreversible capacity, and thus has a problem of causing low initial charge/discharge efficiency (ratio of initial discharge capacity to initial charge capacity).

Therefore, the following proposals have been made.

Patent Literatures 1 and 2 propose a negative electrode mainly composed of a silicon oxide and a pre-doping of lithium into the negative electrode, in view of improving the initial charge/discharge efficiency of the negative electrode. These references explain that this pre-doping of lithium enables inclusion of lithium equivalent to the irreversible capacity of the negative electrode, into the negative electrode active material in the battery, which causes the initial charge/discharge efficiency and the average discharge voltage to improve.

Patent Literature 3 proposes adding a silicon oxide to a negative electrode mainly composed of graphite and using a positive electrode containing a lithium nickel oxide which has a large irreversible capacity, for the purpose of suppressing increase in the negative electrode potential at the final stage of discharge.

CITATION LIST

Patent Literature

Patent Literature 1: Japanese Laid-Open Patent Publication No. 2009-076372
Patent Literature 2: Japanese Laid-Open Patent Publication No. 2007-242590
Patent Literature 3: Japanese Laid-Open Patent Publication No. 2011-113863

SUMMARY OF INVENTION

Technical Problem

Since the negative electrodes in Patent Literatures 1 and 2 are mainly composed of a silicon oxide, even if they are pre-doped with lithium, improvement in their initial charge/discharge efficiency will be limited. Moreover, when the silicon oxide content in the negative electrode material mixture layer is large, a buffer layer will be required on a surface of the negative electrode material mixture layer, to suppress rapid reaction between the silicon oxide and the lithium. However, such a buffer layer will cause increase in the internal resistance of the battery and reduction in the energy density of the battery.

In the case of Patent Literature 3, since the graphite content in the negative electrode material mixture layer is large, expansion and contraction of the silicon oxide can presumably be lessened to a certain extent. However, since the irreversible capacity of the positive electrode is increased in accordance with the irreversible capacity of the negative electrode, it is difficult to secure the energy density of the battery.

Solution to Problem

Therefore, an object of the invention is to provide a non-aqueous electrolyte secondary battery capable of suppressing the lowering of its initial charge/discharge efficiency as well as having a high energy density and good cycle characteristics, when its negative electrode includes a negative electrode active material containing a silicon oxide and a carbon material.

One aspect of the invention relates to a negative electrode for a non-aqueous electrolyte secondary battery, the negative electrode including a negative electrode active material including a silicon oxide represented by $SiO_x$ ($0.5 \leq x < 1.5$) and a carbon material, a proportion of a mass of the silicon oxide relative to a total mass of the silicon oxide and the carbon material: y satisfying $0.03 \leq y \leq 0.3$, and a difference between a theoretical capacity density of the negative electrode active material and a charge capacity density of the negative electrode active material when a cutoff voltage is 5 mV relative to lithium metal: $\Delta C$ (mAhg$^{-1}$) satisfying $L = \Delta C/100$ and $6y \leq L \leq 12y + 0.2$.

Another aspect of the invention relates to a non-aqueous electrolyte secondary battery including:
the foregoing negative electrode;
a positive electrode capable of electrochemically absorbing and releasing lithium; and
a non-aqueous electrolyte.

The theoretical capacity density $C_t$ of the foregoing negative electrode active material is assumed to be a capacity density (mAh/g) obtained by the following formula (1), based on a supposition that: a theoretical charge capacity density of graphite is 372 mAh/g; 4 atoms of lithium for every 1 atom of Si is inserted in the $SiO_x$ by a reaction for charge; and 10% of a surface of the $SiO_x$ is coated with a material such as carbon that does not contribute to reactions with lithium for charge and discharge.

$$C_t = y \times 4 \times F/(28.1+16x) \times 0.9 + (1-y) \times 372 \quad (1)$$

In this formula, F is a Faraday constant (=28600 mAh), and x and y are as mentioned above.

Advantageous Effects of Invention

According to the invention, there can be provided a negative electrode for a non-aqueous electrolyte secondary battery useful in obtaining a non-aqueous electrolyte secondary battery having a high energy density and good cycle characteristics, without significant lowering of its initial charge/discharge efficiency.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
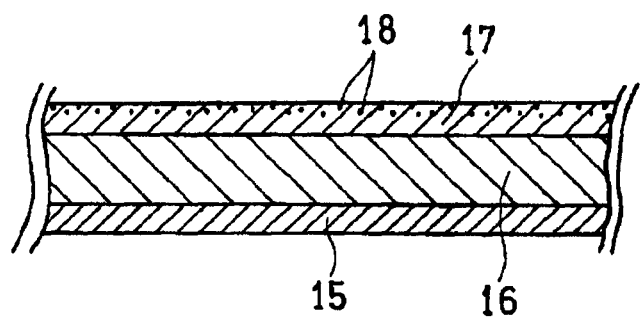
FIG. 1 is a vertical sectional view of a negative electrode for a non-aqueous electrolyte secondary battery according to one embodiment of the invention, schematically showing the state thereof before battery assembling.

A negative electrode of the invention includes a negative electrode active material containing a silicon oxide represented by $SiO_x$ (0.5≤x<1.5) and a carbon material. A proportion of a mass of the silicon oxide relative to a total mass of the silicon oxide and the carbon material: y satisfies 0.03≤y≤0.3; and a difference between a theoretical capacity density of the negative electrode active material and a charge capacity density of the negative electrode active material when a cutoff voltage is 5 mV relative to lithium metal: ΔC (mAhg$^{-1}$) satisfies L=ΔC/100 and 6y≤L≤12y+0.2.

The foregoing negative electrode can effectively utilize the high capacity characteristics (or high energy density) enabled by the combined use of the silicon oxide and the carbon material as the negative electrode active material; and can also suppress lowering of initial efficiency. Initial efficiency of a negative electrode using a silicon oxide tends to lower. However, according to the invention, initial efficiency of the negative electrode can be increased to 95% or higher. Since the negative electrode of the invention has high capacity and good initial efficiency, it is useful as a negative electrode for a non-aqueous electrolyte secondary battery. Initial efficiency refers to a ratio of discharge capacity to charge capacity at initial charge and discharge (initial charge/discharge efficiency), expressed as percentage. Note that preconditioning charge and discharge can be carried out once or several times prior to initial charge and discharge.

In the invention, high capacity and good initial efficiency can be obtained, presumably due to the following reasons.

A silicon oxide $SiO_x$ used as a negative electrode active material has a theoretical capacity density 5 times higher or much higher than a theoretical capacity density of graphite. Therefore, if a silicon oxide is mixed with an existing carbon material (i.e., a carbonaceous negative electrode active material), the negative electrode capacity will increase, enabling the energy density of the battery to increase. On the other hand, since the volume of a silicon oxide greatly expands and contracts in association with reactions for charge and discharge involving lithium, if the percentage thereof in the negative electrode active material increases, poor electrical contact between the negative electrode active material and the negative electrode current collector is caused in association with charge/discharge cycles, and charge/discharge cycle life tends to become shorter.

Therefore, due to 0.03≤y≤0.3 being the proportion y of the mass of the silicon oxide relative to the total mass of the silicon oxide and the carbon material, reduction in charge/discharge cycle life of the negative electrode is suppressed, while high capacity characteristics of the silicon oxide is imparted to the negative electrode. If the proportion y is less than 0.03, even when the initial efficiency of the negative electrode is increased, for example, by pre-doping of lithium, a charge capacity density thereof is substantially the same as a theoretical capacity density of graphite; therefore, the effect of improvement in the capacity due to using the silicon oxide cannot be obtained. If the proportion y is more than 0.3, the influence of change in the volume of the silicon oxide due to its expansion and contraction in association with charge and discharge increases; therefore the capacity becomes greatly reduced. Moreover, if the initial efficiency is to be increased by pre-doping, lithium for compensation will be required in large amounts, and this will likely cause reduced productivity.

The charge capacity density of the negative electrode can be evaluated, for example, by using the charge capacity density of the negative electrode active material when the cutoff voltage is 5 mV relative to lithium metal. Particularly, evaluation made by using the charge capacity density of the negative electrode at initial charge and discharge (initial charge capacity density $C_i$ (mAhg$^{-1}$)) will be more precise. Here, the initial charge capacity density $C_i$ (mAhg$^{-1}$) of the negative electrode refers to the result obtained by dividing the negative electrode capacity (mAh) at charge when the cutoff voltage is 5 mV relative to lithium metal, by a mass (g) of the negative electrode active material included in the negative electrode, for initial charge and discharge when charge and discharge are carried out using lithium metal as a counter electrode.

Regarding the negative electrode active material containing the silicon oxide and the carbon material, the inventors found that high initial efficiency and high capacity retention rate are obtained, in the case where the proportion y of the mass of the silicon oxide is of the foregoing range, and furthermore, a predetermined relation is satisfied between the proportion y and the difference $\Delta C$ ($=C_t-C_c$) between the theoretical capacity density $C_t$ of the negative electrode active material and the charge capacity density $C_c$ of the negative electrode. This will be described in detail below. Note that this difference $\Delta C$ is preferably a difference ($=C_t-C_i$) between the theoretical capacity density $C_t$ of the negative electrode active material and the initial charge capacity density $C_i$ of the negative electrode. The theoretical capacity density $C_t$ of the negative electrode active material can be obtained by the abovementioned formula (1).

Figure 4:
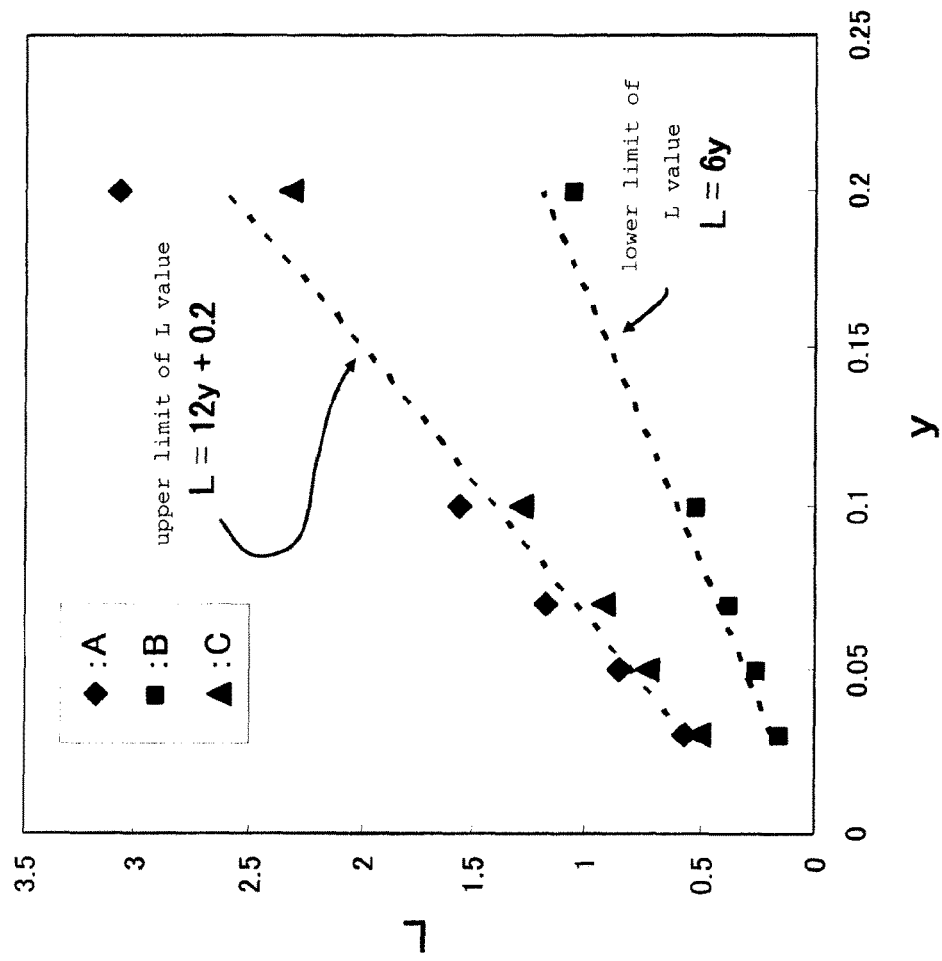
FIG. 4 is a graph showing a relation between ΔC/100 (=L) and y, when the difference ΔC is measured using different values for the proportion y of the mass of the silicon oxide.
Figure 5:
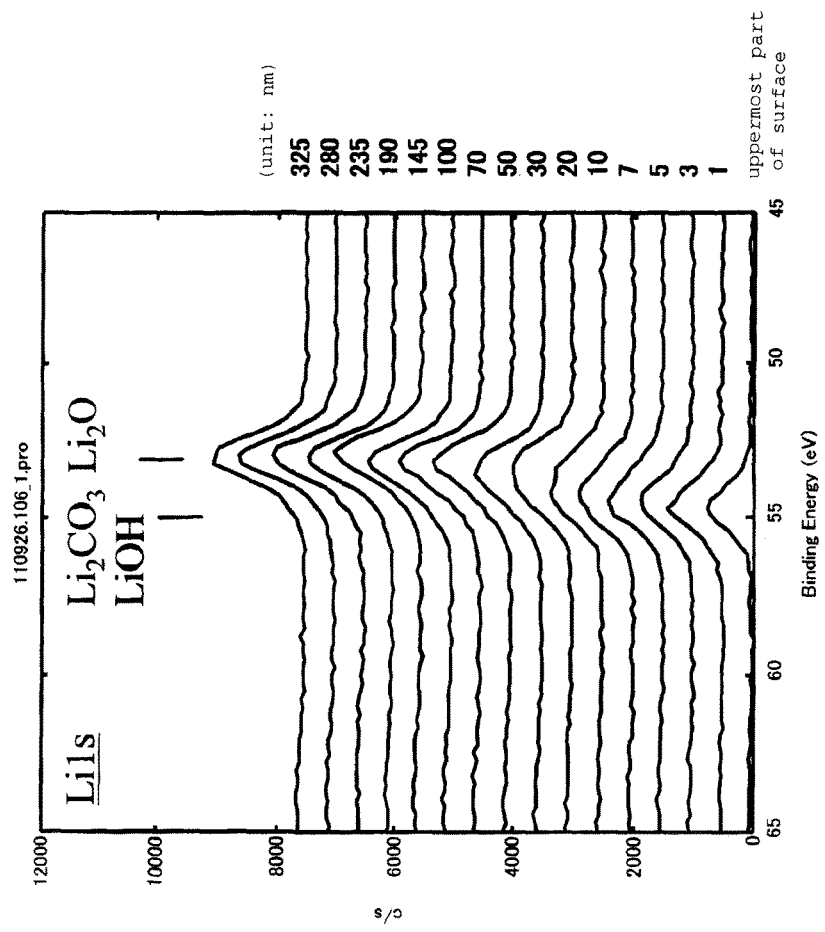
FIG. 5 is a Li-1s spectrum, obtained by X-ray photoelectron spectroscopy, for a surface of a negative electrode material mixture layer produced in Example 1.

FIG. 4 is a graph showing a relation between $\Delta C/100$ (=L) and y, when the difference $\Delta C$ is measured with changes made to the proportion y of the mass of the silicon oxide.

Plotted as variables A are the values L when the theoretical capacity density $C_t$ and an amount of lithium for pre-doping are adjusted such that a reversible capacity density of the negative electrode active material becomes equivalent to a theoretical discharge capacity density of graphite, and the proportion y is changed in the range of $0.03 \leq y \leq 0.3$. Plotted as variables B are the values L each capable of making the initial efficiency 95% when the proportion y is changed in the range of $0.03 \leq y \leq 0.3$. From the plots of the variables A and B, it is evident that the L value increases linearly as the proportion y increases.

Approximate line for the plot of the variables A can be expressed by $L=14.7y+0.1$, whereas that for the plot of variables B can be expressed by $L=5.4y$.

A negative electrode using graphite has a high initial efficiency, but cannot obtain a discharge capacity that high. In contrast, a negative electrode using a silicon oxide obtains a high discharge capacity, but has a low initial efficiency. Therefore, if the L value is in a region between the plots of the variables A and B in the graph when the proportion y of the mass of the silicon oxide is $0.03 \leq y \leq 0.3$, presumably, a discharge capacity higher than that of a negative electrode using graphite will be obtained, and an initial efficiency of 95% or higher can be obtained for the negative electrode.

When the proportion y is actually changed in the range of $0.03 \leq y \leq 0.3$, the values L each capable of making the initial efficiency 100% are plotted as variables C, and these values are each present in the region between the plots of the variables A and B. That is, if the negative electrode has the value L capable of making the initial efficiency 100%, its discharge capacity becomes higher than when graphite is used, and its initial efficiency naturally becomes higher than that obtained by the variable B (initial efficiency: 95%). Approximate line for the plot for the variables C can be expressed by $L=10.7y+0.2$.

In the graph, if the value L is present above the plot of the variables A, the initial charge capacity density of the negative electrode becomes lower than that of graphite, and the advantage of using the silicon oxide is lost. If the value L is present below the plot of the variables B, the initial efficiency of the negative electrode becomes lower than 95%. Therefore, the region between the approximate lines of the variables A and B is presumably adequate for achieving the charge/discharge capacities and the initial efficiency, to certain levels.

However, for the value L, the upper limit needs to be 12y+0.2 in view of more reliably securing high charge/discharge capacities; and the lower limit needs to be 6y in order to reliably obtain an initial efficiency of 95% or higher for the negative electrode. As the foregoing, the inventors found that the active material satisfying $6y \leq L \leq 12y+0.2$ makes possible an initial efficiency of 95% or higher for the negative electrode, and initial charge/discharge capacities higher than the reversible capacity of an existing graphite negative electrode.

Due to $L \geq 6y$, an initial efficiency of 95% or higher is obtained more reliably. Thus, there is no need to suppress initial efficiency of the positive electrode for obtaining good cycle characteristics. Thus, for the battery, lowering of initial efficiency can be suppressed and energy density can be improved. Due to $L \leq 12y+0.2$, the charge/discharge capacities of the negative electrode active material can be made higher than the reversible capacity of an existing graphite negative electrode. Thus, the effect of higher capacity due to including the silicon oxide in the active material can be exerted sufficiently.

The difference $\Delta C$ is preferably smaller or larger than the irreversible capacity density. The former is preferable, because when the difference $\Delta C$ is smaller than the irreversible capacity density (that is, being in a region below the plot of the variables C ($L<10.7y+0.2$)), initial efficiency can be increased, without the capacity used for pre-doping causing major loss in the high charge capacity density obtained due to the silicon oxide. The latter is also preferable, because when the difference $\Delta C$ is larger than the irreversible capacity density (that is, being in a region above the plot of the variables C ($L>10.7y+0.2$)), initial efficiency can be increased while capacity larger than that of graphite is maintained; and also, expansion and contraction of the silicon oxide in association with charge and discharge can be suppressed by compensating an irreversible capacity density thereof entirely by pre-doping.

In the silicon oxide $SiO_x$, x is 0.5 or more, preferably more than 0.5, and further preferably 0.7 or more. x is less than 1.5, preferably 1.2 or less, and further preferably 1.1 or less, or 1 or less. When x is as above, expansion coefficient of the negative electrode can be prevented from becoming too high, while high capacity of the negative electrode is secured. The lower and upper limits for x may be arbitrarily selected and combined. x may be, for example, $0.5 \leq x \leq 1.2$ or $0.5 \leq x \leq 1$.

The proportion y of the mass of the silicon oxide relative to the total mass of the silicon oxide and the carbon material, is 0.03 or more, preferably 0.04 or more, and further preferably 0.08 or more. The proportion y is 0.3 or less, preferably 0.25 or less, and further preferably 0.2 or less, or 0.15 or less. When the proportion y is as above, a high negative electrode capacity is obtained, and also, it becomes easier to increase the initial efficiency of the negative electrode. Thus, battery capacity and cycle characteristics can be improved with balance. The lower and upper limits for the proportion y can be arbitrarily selected and combined. The proportion y may be, for example, $0.03 \leq y \leq 0.25$ or $0.03 \leq y \leq 0.15$.

The silicon oxide is in the form of particles, and the average particle size (volume-based median diameter) is preferably 0.1 μm to 10 μm. In view of capacity maintenance during charge/discharge cycles, the average particle size is further preferably 0.5 μm to 5 μm.

The carbon material used in the negative electrode active material is not particularly limited, as long as it can reversibly absorb and release lithium. Examples of the carbon material include graphite, graphitizable carbon (soft carbon), and non-graphitizable carbon (hard carbon). Graphite refers to a material having a crystal structure of graphite, and examples thereof include natural graphite, artificial graphite, and graphitizable mesophase carbon particles. These carbon materials may be used singly or in a combination of two or more. Graphite is preferred as the carbon material in terms of obtaining high capacity.

The silicon oxide particles preferably have a surface coated with the carbon material, to secure conductivity and dispersibility of the particles. By mixing the silicon oxide and the carbon material prior to formation of the negative electrode, the surface of the silicon oxide particles can be coated with the carbon material.

In a preferred embodiment, the negative electrode can include: a negative electrode current collector; and a negative electrode material mixture layer including the negative electrode active material and adhering to (or formed on) a surface of the negative electrode current collector.

In addition to the negative electrode active material, the negative electrode material mixture layer can include a binder, a conductive agent, and/or a thickener as optional components. The negative electrode material mixture layer can be formed, for example, by applying a negative electrode material mixture slurry including the negative electrode active material, the binder, the conductive agent, and/or the thickener, and a dispersion medium to the surface of the negative electrode current collector, followed by drying. The resultant coating after drying may be pressed as necessary. The negative electrode material mixture layer may be formed on one surface, or both surfaces, of the negative electrode current collector.

Examples of the binder include a resin material such as: fluorocarbon resins such as polytetrafluoroethylene and polyvinylidene fluoride (PVDF); polyolefin resins such as polyethylene and polypropylene; polyamide resins such as aramid resin; polyimide resins such as polyimide and polyamide-imide; acrylic resins such as polyacrylic acid, polymethyl acrylate, and ethylene-acrylic acid copolymers; vinyl resins such as polyacrylonitrile and polyvinyl acetate; polyvinylpyrrolidone; polyether sulfone; and rubber materials such as styrene-butadiene copolymer rubber (SBR). These binders may be used singly or in a combination of two or more.

An amount of the binder is, for example, 0.5 to 10 parts by mass and preferably 1 to 5 parts by mass, relative to 100 parts by mass of the active material.

Examples of the conductive agent include: carbon blacks such as acetylene black; conductive fibers such as carbon fibers and metal fibers; carbon fluoride; metal powders such as aluminum powder; conductive whiskers such as zinc oxide whiskers and potassium titanate whiskers; conductive metal oxides such as titanium oxides; and organic conductive materials such as phenylene derivatives. These conductive agents may be used singly or in a combination of two or more.

An amount of the conductive agent is, for example, 10 parts by mass and preferably 1 to 5 parts by mass or less, relative to 100 parts by mass of the active material.

Examples of the thickener include: cellulose derivatives (e.g., cellulose ethers) such as carboxymethyl cellulose (CMC), modified substances thereof (including salts such as sodium salts), and methyl cellulose; saponified polymers having vinyl acetate units, such as polyvinyl alcohol; and polyethers (e.g., polyalkylene oxides such as polyethylene oxides). These thickeners may be used singly or in a combination of two or more.

An amount of the thickener is, for example, 0.1 to 10 parts by mass, and preferably 1 to 5 parts by mass, relative to 100 parts by mass of the active material.

The dispersion medium is not particularly limited, and examples thereof include: water; alcohols such as ethanol; ethers such as tetrahydrofuran; amides such as dimethylformamide; N-methyl-2-pyrollidone (NMP); and mixed solvents thereof.

The negative electrode current collector is a non-porous conductive substrate (e.g., metal foil) or a porous conductive substrate (e.g., mesh, net, punched sheet). Examples of the material for the negative electrode current collector include stainless steel, nickel, nickel alloys, copper, and copper alloys.

A thickness of the negative electrode current collector is not particularly limited, but is preferably 1 to 50 μm, and further preferably 5 to 20 μm, in view of obtaining balance between strength and lightweightedness of the negative electrode.

The negative electrode active material contains the silicon oxide, and thus tends to have a larger irreversible capacity compared to when containing only a carbon material. Therefore, lithium is preferably pre-doped into the negative electrode active material.

Pre-doping of lithium can be carried out, for example, by vacuum vapor deposition of lithium on a surface of the negative electrode material mixture layer, or attachment of lithium foil to the surface thereof, to form a lithium metal layer. Forming a local battery in the negative electrode after forming the lithium metal layer, makes possible introduction of lithium ions into the negative electrode active material in advance. Alternatively, after formation of the lithium metal layer and prior to battery assembling, as necessary, a reaction for charge may be caused at the negative electrode in advance until a predetermined amount of lithium is absorbed by the negative electrode.

In the invention, the proportion y of the mass of the silicon oxide is $0.03 \leq y \leq 0.3$ and thus comparatively small. When the proportion y is as above, the irreversible capacity is not that large compared to when the negative electrode active material contains only a Si alloy or a silicon oxide. Therefore, an amount of lithium required for pre-doping is small and thus difficult to control. However, if pre-doping is by vacuum vapor deposition, the amount of lithium is easier to control; and a highly accurate pre-doping is made possible, even if the amount thereof is small. Thus, the value L can be controlled more easily to remain in the aforementioned range.

Due to pre-doping of lithium, the irreversible capacity of the silicon oxide can be compensated. However, the lithium metal layer formed by pre-doping is highly active; and thus tends to react with oxygen in the air and to degrade before lithium is absorbed by the negative electrode active material. When the negative electrode active material is only a Si alloy or a silicon oxide, the speed of lithium absorption is fast; therefore, degradation of the lithium metal layer is not that remarkable. However, regarding the silicon oxide used in the invention, since the proportion y of the mass of the silicon oxide is small, being $0.03 \leq y \leq 0.3$, the speed of lithium absorption is slow; therefore, degradation of the lithium metal layer tends to be remarkable.

To suppress such degradation of the lithium metal layer, a lithium compound such as a lithium-containing oxide or a lithium-containing carbonate is preferably included in a surface layer portion of the negative electrode. The surface layer portion of the negative electrode may include one of the lithium compound, or two or more thereof. When the surface layer portion of the negative electrode includes the lithium compound(s), degradation of lithium present on a surface of the negative electrode (for example, lithium of the lithium metal layer present on the negative electrode surface after pre-doping) is suppressed; therefore, the negative electrode active material is able to absorb lithium more reliably.

Examples of a lithium-containing oxide include lithium oxide. Examples of a lithium-containing carbonate include lithium carbonate. In the surface layer portion of the negative electrode, a lithium compound other than the lithium-containing oxide or carbonate, e.g., a lithium-containing nitride such as lithium nitride or a lithium-containing hydroxide such as lithium hydroxide, may be further included.

The lithium compound may be included in the surface layer portion of the negative electrode, for example, by being sprayed to the negative electrode. However, the lithium compound is included in the surface layer portion of the negative electrode, preferably after the lithium metal layer is formed on the surface of the negative electrode material mixture layer; therefore, the lithium compound is preferably produced and included therein after the lithium metal layer is formed. The lithium compound can be included in the surface layer portion of the negative electrode, by spraying carbonate gas to the surface thereof after the lithium metal layer is formed on the surface of the negative electrode material mixture layer. In view of suppressing degradation of lithium of the lithium metal layer, the carbonate gas is sprayed to the surface of the negative electrode (i.e., a surface of the lithium metal layer), immediately after the lithium metal layer is formed.

FIG. 1 is a vertical sectional view of a negative electrode according to one embodiment of the invention, schematically showing the state thereof before battery assembling. The negative electrode in FIG. 1 includes a lithium compound at its surface layer.

The negative electrode includes: a negative electrode current collector 15; and a negative electrode material mixture layer 16 formed on a surface of the negative electrode current collector 15. A lithium metal layer 17 is formed on a surface of the negative electrode material mixture layer 16. The surface layer portion of the negative electrode, i.e., a surface layer portion of the lithium metal layer 17, includes a lithium compound 18. The lithium compound 18 is formed by a reaction between lithium included in the lithium metal layer 17 and carbon dioxide or the air. Therefore, the lithium compound 18 is unevenly distributed and scattered in the surface layer portion of the lithium metal layer.

In the surface layer portion of the negative electrode, a region containing the lithium compound preferably has a thickness of 0.1 to 3 μm, and further preferably 0.1 to 1 μm, measured from a surface of the negative electrode (or a surface of the lithium metal layer). When the lithium compound is present in the region of the above thickness, reactions which cause degradation of the lithium metal layer can be effectively suppressed, and resistance of the negative electrode can be kept low; therefore, reduction in energy density can be suppressed.

When the negative electrode of the invention is used in producing a non-aqueous electrolyte secondary battery, the battery capacity is preferably regulated by the positive electrode capacity (that is, the positive electrode capacity is made smaller than the negative electrode capacity). When the battery capacity is regulated by the positive electrode capacity, contraction of the silicon oxide at the final stage of discharge is suppressed, and reduction in the capacity retention rate can be suppressed more effectively.

The negative electrode of the invention includes the silicon oxide and the carbon material as a negative electrode active material, and has a high capacity and a high initial efficiency. Therefore, the battery capacity (or energy density) can be improved; and also, cycle characteristics can be improved even if initial efficiency of the positive electrode is not made small. Thus, due to using the negative electrode of the invention in a non-aqueous electrolyte secondary battery, a non-aqueous electrolyte secondary battery with high energy density and good cycle characteristics can be provided.

A non-aqueous electrolyte secondary battery of the invention includes: the foregoing negative electrode; a positive electrode capable of electrochemically absorbing and releasing lithium; and a non-aqueous electrolyte. The non-aqueous electrolyte secondary battery can further include a separator interposed between the negative and positive electrodes.

Figure 2:
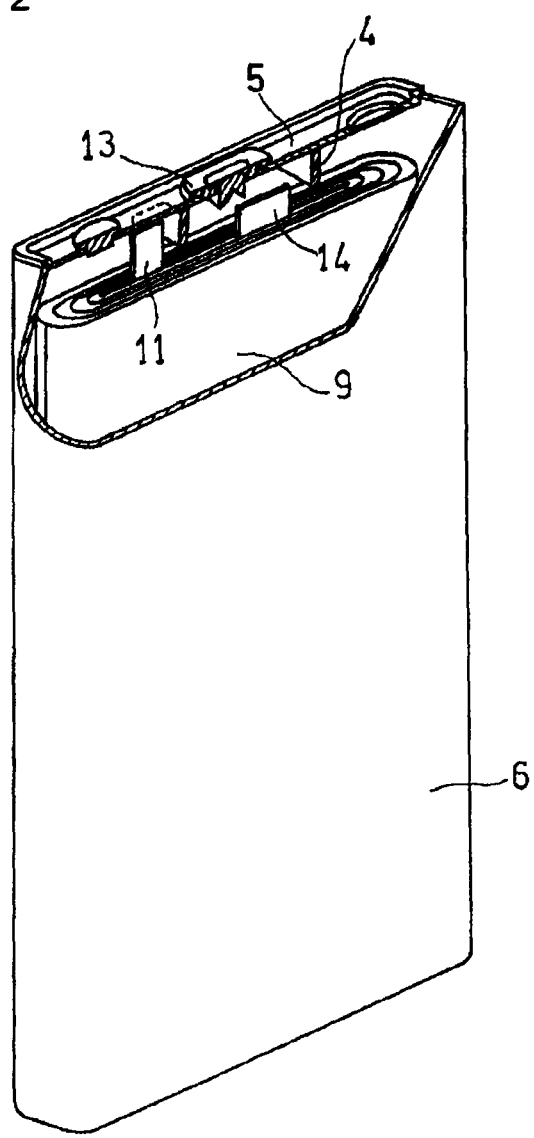
FIG. 2 is a schematic, partially cutaway oblique view of a non-aqueous electrolyte secondary battery according to one embodiment of the invention.
Figure 3:
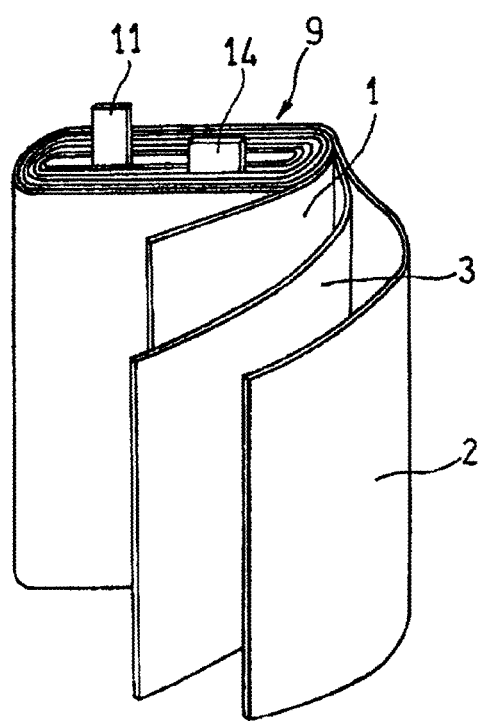
FIG. 3 is a schematic oblique view of an electrode assembly in the non-aqueous electrolyte secondary battery of FIG. 2.

FIG. 2 is a schematic, partially cutaway oblique view of a non-aqueous electrolyte secondary battery that is rectangular, according to one embodiment of the invention. FIG. 3 is a schematic oblique view of an electrode assembly in the non-aqueous electrolyte secondary battery of FIG. 2.

The battery includes: a rectangular, bottom closed battery case 6; an electrode assembly 9 housed in the battery case 6; and a non-aqueous electrolyte (not illustrated). The electrode assembly 9 has: a negative electrode 1 in long strip form; a positive electrode 2 in long strip form; and a separator 3 interposed therebetween and thus preventing direct contact therebetween. The electrode assembly 9 is formed by winding the negative electrode 1, the positive electrode 2, and the separator 3 around a core in plate form, and then pulling out the core.

The negative electrode 1 includes: a negative electrode current collector; and a negative electrode active material layer (negative electrode material mixture layer) including a negative electrode active material, adhering to both surfaces of the negative electrode current collector. One end of a negative lead 11 is attached to the negative electrode current collector, by welding or the like. The positive electrode 2 includes: a positive electrode current collector; and a positive electrode active material layer (positive electrode material mixture layer) including a positive electrode active material, adhering to both surfaces of the positive electrode current collector. One end of a positive lead 14 is attached to the positive electrode current collector, by welding or the like.

The other end of the negative lead 11 is electrically connected to a negative terminal 13 provided on a sealing plate 5. The other end of the positive lead 14 is electrically connected to the battery case 6 also serving as a positive terminal. On the upper part of the electrode assembly 9, a resin frame member 4 which separates the electrode assembly 9 and the sealing plate 5, as well as the negative lead 11 and the battery case 6, is disposed. The opening of the battery case 6 is sealed with the sealing plate 5.

In the following, a more detailed description will be given of the components other than the negative electrode in the non-aqueous electrolyte secondary battery of the invention. However, it is to be understood that the invention relates to the negative electrode, and that the other components are not particularly limited.

The positive electrode includes the positive electrode current collector and the positive electrode material mixture layer formed or carried on a surface (s) of the positive electrode current collector. In addition to the positive electrode active material, the positive electrode material mixture layer can include a binder and/or a conductive agent as optional component(s). The positive electrode can be formed, for example, by using a positive electrode material mixture slurry including the positive electrode active material, a binder and/or a conductive agent, and a dispersion medium, as with the negative electrode.

The positive electrode active material can be a lithium-containing composite metal oxide, examples thereof including: $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, and $Li_2MePO_4F$ (all in which M is at least one of Na, Mg, Sc, Y, Mn, Fe, Co, Ni, Cu, Zn, Al, Cr, Pb, Sb, and B). Here, a=0 to 1.2, b=0 to 0.9, and c=2.0 to 2.3. The value a indicating the molar ratio of lithium is that immediately after production of the active material, and increases and decreases in accordance with charge and discharge. Furthermore, the elements forming these lithium-containing compounds may be partially replaced with other element(s). A surface of the positive electrode active material may be treated with a metal oxide, a lithium oxide, a conductive agent, or the like; or may be hydrophobized.

Examples of the binder and the conductive agent can include ones similar to those exemplified above for the negative electrode. The conductive agent may be graphite such as natural graphite or artificial graphite.

An amount of the binder is, for example, 0.5 to 10 parts by mass, and preferably 1 to 5 parts by mass, relative to 100 parts by mass of the positive electrode active material. An amount of the conductive agent is, for example, 0.5 to 20 parts by mass, and preferably 1 to 10 parts by mass, relative to 100 parts by mass of the positive electrode active material.

Shape and thickness of the positive electrode current collector can each be selected from shape and thickness ranges similar to those given for the negative electrode current collector. Examples of the material of the positive electrode current collector include stainless steel, aluminum, aluminum alloys, and titanium.

The separator is not particularly limited, as long as it has high ion permeability and moderate levels of mechanical strength and insulating properties; and can be a thin microporous film, a woven fabric, a non-woven fabric, or the like. A known material can be used as the material of the separator, and a polyolefin such as polypropylene or polyethylene is preferable, in view of obtaining high durability and high shutdown function, as well as easily securing battery safety. The microporous film may be a monolayer film made of a single material, or a composite or multilayer film made of a single material or two or more materials.

The separator has a thickness of, for example, 10 to 300 μm, preferably 10 to 40 μm, and further preferably 15 to 30 μm or 10 to 25 μm.

The separator preferably has a porosity of 30 to 70%. Here, porosity refers to the percentage of a porous portion in the separator, in terms of volume. The separator porosity is further preferably 35 to 60%.

The non-aqueous electrolyte includes: a non-aqueous solvent; and a lithium salt (solute) dissolved in the non-aqueous solvent.

The non-aqueous solvent is a known one used in a non-aqueous electrolyte for a non-aqueous electrolyte secondary battery, examples thereof including cyclic carbonic acid esters, chain carbonic acid esters, and cyclic carboxylic acid esters. Examples of a cyclic carbonic acid ester include propylene carbonate (PC) and ethylene carbonate (EC). Examples of a chain carbonic acid ester include diethyl carbonate (DEC), ethyl methyl carbonate (EMC), and dimethyl carbonate (DMC). Examples of a cyclic carboxylic acid ester include γ-butyrolactone (GBL) and γ-valerolactone (GVL). These non-aqueous solvents may be used singly or in a combination of two or more.

Examples of the lithium salt include: lithium salts of chlorine-containing acid (e.g., $LiClO_4$, $LiAlCl_4$, $LiB_{10}Cl_{10}$; lithium salts of fluorine-containing acid (e.g., $LiPF_6$, $LiBF_4$, $LiSbF_6$, $LiAsF_6$, $LiCF_3SO_3$, $LiCF_3CO_2$); lithium salts of fluorine-containing acid imide (e.g., $LiN(CF_3SO_2)_2$, $LiN(CF_3SO_2)(C_4F_9SO_2)$, $LiN(C_2F_5SO_2)_2$); and lithium halides (e.g., LiCl, LiBr, LiI). These lithium salts may be used singly or in a combination of two or more.

The concentration of the lithium salt in the non-aqueous electrolyte is, for example, 0.5 to 2 mol/L.

The non-aqueous electrolyte may contain a known additive, examples thereof including: additives (additives A) that decompose on the negative electrode to form a film with high lithium ion conductivity, and thus increase the charge/discharge efficiency of the battery; and additives (additives B) that decompose during overcharge to form a film on the electrode(s), and thus cause the battery to become inactive.

The content of the additive in the non-aqueous electrolyte is, for example, 10 mass % or less and preferably 7 mass % or less.

Examples of the additive A include: cyclic carbonates having a polymerizable unsaturated bond (e.g., vinylene group, vinyl group) and cyclic carbonates having a fluorine atom (e.g., fluoroethylene carbonate (FEC), fluoropropylene carbonate).

Examples of a cyclic carbonate having a vinylene group include: vinylene carbonate (VC); and VC having a $C_{1-4}$alkyl group and/or a $C_{6-10}$aryl group as substituent(s), examples thereof including 4-methylvinylene carbonate, 4,5-dimethylvinylene carbonate, 4-ethylvinylene carbonate, and 4-phenylvinylene carbonate.

Examples of acyclic carbonate having a vinyl group include: ECs having a vinyl group as a substituent such as vinylethylene carbonate (VEC) and divinylethylene carbonate. Regarding these compounds, hydrogen atoms of the substituent or hydrogen atoms of the cyclic carbonate can be partially replaced with fluorine atoms, and be used as the additive A as well.

These additives A may be used singly or in a combination of two or more.

Examples of the additive B include: aromatic compounds having an aliphatic ring; and aromatic compounds having a plurality of aromatic rings.

Examples of the aliphatic ring include: cycloalkane rings such as cyclohexane ring; cyclic ethers; and cyclic esters. A preferred aromatic compound has an aliphatic ring among those given above, as a substituent. Specific examples of such an aromatic compound include benzene compounds such as cyclohexylbenzene.

Examples of an aromatic compound having a plurality of aromatic rings include biphenyls and diphenyl ethers.

These additives B may be used singly or in a combination of two or more.

The non-aqueous electrolyte may be in liquid form, or in gel or solid form.

The non-aqueous electrolyte in liquid form includes: the non-aqueous solvent; and the lithium salt dissolved in the non-aqueous solvent.

The non-aqueous electrolyte in gel form includes: the foregoing non-aqueous electrolyte in liquid form; and a polymer material which retains the foregoing non-aqueous electrolyte in liquid form.

Examples of the polymer material include: fluorocarbon resins such as PVDF and vinylidene fluoride-hexafluoropropylene copolymers; vinyl resins such as polyacrylonitrile and polyvinylchloride; polyalkylene oxides such as polyethylene oxides; and acrylic resins such as polyacrylates.

Examples of the non-aqueous electrolyte in solid form include solid polymer electrolytes. Examples of the polymer electrolyte include: perfluorosulfonic acid-polytetrafluoroethylene copolymers ($H^+$ type); sulfonated polyethersulfone ($H^+$ type); and aminated polyethersulfone ($OH^-$ type).

(Other Components)

The electrode assembly is not limited to a wound type as illustrated in FIG. 3, and may be a stacked type which includes a zig-zag folded type. Shape of the electrode assembly may be in accordance with the shape of the battery or the battery case; and may be a cylindrical assembly, or a flat assembly having oblong end surfaces perpendicular to the winding axis.

The battery case may be made of metal or a laminate film. Examples of the metal material of the battery case include aluminum, aluminum alloys (e.g., alloys containing a small amount of metal such as manganese, copper, or the like), iron, and steel plates of stainless steel or the like. The battery case may be plated with nickel or the like, as necessary.

Shape of the battery case may be in accordance with the shape of the electrode assembly; and may be prismatic, cylindrical, or the like.

EXAMPLES

Next, the invention is specifically described by way of Examples and Comparative Examples. The following Examples, however, are not to be construed as limiting, in any way, the scope of the invention.

Example 1

The non-aqueous electrolyte secondary battery of FIG. 2 was produced in the following manner.

(1) Production of Negative Electrode (a) Ninety parts by mass of artificial graphite powder and 10 parts by mass of silicon oxide (SiO) powder were mixed, thereby to prepare a negative electrode active material (y=0.1) in powder form. With 98 parts by mass of this negative electrode active material, an SBR dispersion (mass of SBR: 1 part by mass) serving as a binder and 1 part by mass of a CMC sodium salt serving as a thickener were mixed; and the resultant mixture was dispersed in pure water, thereby to prepare a slurry of a negative electrode material mixture. This negative electrode material mixture was applied to both surfaces of a copper foil (thickness: 8 μm) serving as a negative electrode current collector; and the resultant was dried and then rolled to a thickness of 120 μm. The rolled product was then dried for 10 hours at 190° C. in a nitrogen atmosphere.

(b) To pre-dope lithium into the negative electrode active material, the electrode plate obtained in (a) above was placed in a vacuum chamber; and by vacuum vapor deposition, a lithium layer (thickness: 3 μm) was formed on a surface of the electrode plate. After vacuum vapor deposition, carbon dioxide was introduced into the chamber, until the pressure therein became the atmospheric pressure. In the foregoing manner, the negative electrode plate was produced.

The negative electrode plate was cut to a predetermined size, thereby to obtain a negative electrode 1.

(2) Production of Positive Electrode

With 98 parts by mass of lithium cobaltate powder serving as a positive electrode active material, 1 part by mass of acetylene black serving as a conductive agent and 1 part by mass of PVDF serving as a binder were mixed; and the resultant mixture was dispersed in dehydrated NMP, thereby to prepare a slurry of a positive electrode material mixture. This positive electrode material mixture was applied to both surfaces of an aluminum foil (thickness: 15 μm) serving as a positive electrode current collector; and the resultant was dried and then rolled to a thickness of 120 μm, thereby to produce a positive electrode plate.

The positive electrode plate was cut to a predetermined size, thereby to obtain a positive electrode 2.

(3) Preparation of Non-Aqueous Electrolyte

FEC was added to a non-aqueous solvent containing EC, EMC, and DEC at a volume ratio of 2:3:5; and $LiPF_6$ was dissolved in this non-aqueous solvent, thereby to prepare a non-aqueous electrolyte. A concentration of the FEC in the non-aqueous electrolyte was 6 mass %, whereas a concentration of the $LiPF_6$ therein was 1.4 mol/L.

(4) Production of Battery

One end of a negative lead 11 made of nickel was attached to the negative electrode 1 obtained in (1) above. One end of a positive lead 14 made of aluminum was attached to the positive electrode 2 obtained in (2) above. The negative electrode 1 and the positive electrode 2 were made to face each other, with a separator 3 interposed therebetween; the resultant was wound around a core in plate form, thereby to produce an electrode assembly 9; and then, the core was pulled out. The other end of the negative lead 11 was electrically connected to a terminal 13 provided on a sealing plate 5. The other end of the positive lead 14 was electrically connected to a battery case 6 also serving as a positive terminal. The electrode assembly 9 was then put into a battery case 6, and the opening of the battery case 6 was sealed with the sealing plate 5. After the non-aqueous electrolyte (not illustrated) prepared in (3) above was poured in from an injection hole, the injection hole was sealed, thereby to complete a non-aqueous electrolyte secondary battery. For the separator 3, a microporous polypropylene film (thickness: 20 μm) was used.

(5) Evaluation of Negative Electrode and Battery

The negative electrode and battery were evaluated in the following manner.

(a) Initial charge capacity density, initial efficiency, and L value of negative electrode Using the negative electrode obtained in (1) above and lithium metal (thickness: 300 μm) as a counter electrode, constant-current charge was conducted at a current of 5 mA until a cutoff voltage of 5 mV; and constant-current discharge was conducted at a current of 5 mA until a cutoff voltage of 1.5 V. A negative electrode capacity (mAh) during charge was measured, and the obtained value was divided by a mass (g) of the negative electrode active material included in the negative electrode, thereby to obtain an initial charge capacity density $C_i$ ($mAhg^{-1}$). Moreover, a discharge capacity (mAh) was measured, and the obtained value was divided by the negative electrode capacity during charge (charge capacity), thereby to obtain an initial efficiency (ratio of initial discharge capacity to initial charge capacity).

A theoretical capacity density $C_t$ of the negative electrode active material was obtained by the aforementioned formula (1). A difference $\Delta C = C_t - C_i$ ($mAhg^{-1}$) in capacity density was obtained from this theoretical capacity density $C_t$ and the initial charge capacity density $C_i$; and a L value (L=$\Delta C$/100) was obtained from the difference $\Delta C$.

(b) Initial Efficiency and Capacity Retention Rate of Battery

Constant-current charge was conducted on the battery obtained in (4) above at a maximum current of 200 mA until an upper voltage limit of 4.3 V; and constant-voltage charge was further conducted thereon at a constant voltage of 4.3 V until 50 mA. Next, constant-current discharge was conducted on the charged battery at a current of 200 mA until a cutoff voltage of 3.0 V. The above charge and discharge were repeated; a charge capacity and a discharge capacity after the 1$^{st}$ and 6$^{th}$ cycles were measured; and a discharge capacity after the 100$^{th}$ cycle was measured.

Referring to the charge capacity and the discharge capacity after the 1$^{st}$ cycle as an initial charge capacity and an initial discharge capacity, respectively, a percentage (%) of the initial discharge capacity relative to the initial charge capacity was obtained as an initial efficiency of the battery.

Referring to the discharge capacity after the 6$^{th}$ cycle as 100%, a percentage of the discharge capacity after the 100$^{th}$ cycle relative to the discharge capacity after the 6$^{th}$ cycle was obtained as the capacity retention rate (o).

The initial charge capacity of the battery was divided by the total weight (g) of the negative electrode active material, thereby to obtain an initial charge capacity density (mAhg$^{-1}$) of the negative electrode of the battery.

Examples 2 to 5 and Comparative Examples 1 to 6

Negative electrodes and batteries were produced as in Example 1, except for changing the proportion y of the SiO powder relative to the total mass of the artificial graphite powder and the SiO powder to values shown in Table 1, and also changing the thickness of the lithium layer to values shown in Table 1. The negative electrodes and the batteries obtained were evaluated as in Example 1. However, with respect to producing the negative electrode in Comparative Example 6, after vacuum vapor deposition of lithium, dry air instead of carbon dioxide was introduced into the vacuum chamber, for the vacuum chamber to have an atmospheric pressure.

The evaluation results for the negative electrode are shown in Table 1, and those for the battery are shown in Table 2.

TABLE 1

|  | Thickness of Li layer (μm) | y | $C_i$ (mAhg$^{-1}$) | L | 6y | 12y + 0.2 | Initial efficiency (%) |
|---|---|---|---|---|---|---|---|
| Ex. 1 | 3 | 0.1 | 440 | 1.1 | 0.6 | 1.4 | 100 |
| Ex. 2 | 3.75 | 0.2 | 545 | 1.9 | 1.2 | 2.6 | 98 |
| Ex. 3 | 5.5 | 0.3 | 630 | 2.85 | 1.8 | 3.8 | 95 |
| Ex. 4 | 2 | 0.05 | 400 | 0.6 | 0.3 | 0.8 | 102 |
| Ex. 5 | 1.5 | 0.03 | 380 | 0.5 | 0.18 | 0.56 | 100 |
| Comp. Ex. 1 | 1.75 | 0.02 | 370 | 0.4 | 0.12 | 0.44 | 102 |
| Comp. Ex. 2 | 8 | 1 | 1315 | 8.7 | 6 | 12.2 | 14 |
| Comp. Ex. 3 | 0 | 0.1 | 515 | 0.4 | 0.6 | 1.4 | 87 |
| Comp. Ex. 4 | 0.5 | 0.1 | 510 | 0.4 | 0.6 | 1.4 | 85 |
| Comp. Ex. 5 | 6 | 0.1 | 365 | 1.9 | 0.6 | 1.4 | 119 |
| Comp. Ex. 6 | 3 | 0.1 | 500 | 0.15 | 0.6 | 1.4 | 88 |

TABLE 2

|  | Initial efficiency (%) | Capacity retention rate (%) | Initial charge capacity density of negative electrode (mAhg$^{-1}$) |
|---|---|---|---|
| Ex. 1 | 93 | 93 | 420 |
| Ex. 2 | 92 | 92 | 530 |
| Ex. 3 | 90 | 90 | 620 |
| Ex. 4 | 93 | 93 | 380 |
| Ex. 5 | 93 | 95 | 375 |
| Comp. Ex. 1 | 93 | 95 | 365 |
| Comp. Ex. 2 | 12 | 50 | 1250 |
| Comp. Ex. 3 | 80 | 80 | 490 |
| Comp. Ex. 4 | 82 | 82 | 485 |
| Comp. Ex. 5 | 95 | 92 | 350 |
| Comp. Ex. 6 | 82 | 76 | 470 |

As shown in Table 1, regarding each of the negative electrodes produced in Examples 1 to 5, the L value was 6y≤L≤12y+0.2, and the initial charge capacity density $C_i$ exceeded the theoretical capacity density of graphite (372 mAhg$^{-1}$). Moreover, the initial efficiency of the negative electrode was 95% or higher.

In contrast, regarding the negative electrode produced in Comparative Example 1, since the proportion y of the mass of the SiO in the negative electrode active material was small, although the initial efficiency was favorable, the initial charge capacity density $C_i$ was equal to the theoretical capacity density of graphite. Regarding the negative electrode produced in Comparative Example 2, since the proportion y was large, although the initial charge capacity density $C_i$ far exceeded the theoretical capacity density of graphite, the initial efficiency dropped significantly to 14%. This drop in the initial efficiency is presumably because the stress due to expansion and contraction of SiO was not lessened, thus causing significant peeling off of the negative electrode active material layer.

Regarding each of the negative electrodes produced in Comparative Examples 3 and 4, although the initial charge capacity density $C_i$ was higher than that in Example 1, since the lithium amount for pre-doping was small and the L value was smaller than 6y (L<6y), the initial efficiency was lower than 95%. Furthermore, regarding the negative electrode produced in Comparative Example 5, although the initial efficiency was higher than that in Example 1, since the L value was greater than or equal to 12y+0.2 (L≥12y+0.2), the initial charge capacity density $C_i$ was lower than the theoretical capacity density of graphite. Regarding the negative electrode produced in Comparative Example 6, since the L value was smaller than 6y (L<6y), the initial efficiency dropped compared to that in Example 1.

As shown in Table 2, regarding each of the batteries in Examples 1 to 5, since the initial efficiency of the negative electrode was 95% or higher (see Table 1), the initial efficiency of the negative electrode calculated for the battery was 90% or higher, being close to that of the positive electrode. Thus, the battery produced was able to have a high initial efficiency. Moreover, the initial charge capacity density of the negative electrode calculated from the initial charge capacity of the battery exceeded the theoretical capacity density of an existing graphite negative electrode, i.e., 372 mAhg$^{-1}$. Furthermore, the battery capacity was regulated by the discharge capacity of the positive electrode;

contraction of the SiO at the end of discharge was suppressed; and the capacity retention rate was favorable. Regarding each of the batteries in Comparative Examples 1 and 5, although the initial efficiency and the capacity retention rate were favorable, since the L value was greater than 12y+0.2 (12y+0.2<L), the initial charge capacity density of the negative electrode was lower than the theoretical capacity density of graphite, i.e., 372 mAh/g, and the battery capacity itself was small. In contrast, regarding each of the batteries in Comparative Examples 2 to 4 and 6, since the initial efficiency of the negative electrode was small, the initial efficiency of the battery also dropped. Moreover, since the battery capacity was regulated by the discharge capacity of the negative electrode, the SiO contracted at the end of discharge, and the capacity retention rate dropped.

Moreover, elemental analysis by X-ray photoelectron spectroscopy was conducted on a surface of the negative electrode used in Example 1. As a result, it became evident that a lithium-containing carbonate and a lithium-containing oxide were present on the surface, in a form of a 0.3 μm-thick layer. Due to the presence of this layer, presumably, the vapor-deposited lithium was reliably pre-doped into the negative electrode, without degradation of the lithium layer.

Although the batteries in the above Examples are rectangular, the same effects are obtained even if they are, for example, cylindrical, flat, or laminated.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

INDUSTRIAL APPLICABILITY

According to the negative electrode of the invention, there can be provided a non-aqueous electrolyte secondary battery having high energy density and good cycle characteristics. Moreover, a solution is provided for the problem of low initial efficiency of the battery, such problem occurring when a material with high capacity is used as a negative electrode active material. The non-aqueous electrolyte secondary battery of the invention is useful as the main power source for devices such as mobile communication devices and portable electronic devices.

REFERENCE SIGNS LIST 1 negative electrode
2 positive electrode
3 separator
4 frame member
5 sealing plate
6 battery case
9 electrode assembly
11 negative lead
13 negative terminal
14 positive lead
15 negative electrode current collector
16 negative electrode material mixture layer
17 lithium metal layer
18 lithium compound

The invention claimed is:

1. A negative electrode for a non-aqueous electrolyte secondary battery,
the negative electrode including a negative electrode active material including a silicon oxide represented by $SiO_x$ ($0.5 \leq x < 1.5$) and a carbon material,
a proportion of a mass of the silicon oxide relative to a total mass of the silicon oxide and the carbon material: y satisfying $0.03 \leq y \leq 0.3$, and
a difference between a theoretical capacity density of the negative electrode active material and a charge capacity density of the negative electrode active material when a cutoff voltage is 5 mV relative to lithium metal: $\Delta C$ ($mAhg^{-1}$) satisfying $L = \Delta C/100$ and $6y \leq L \leq 12y+0.2$,
wherein:
the negative electrode includes: a negative electrode current collector including a metal foil; and a negative electrode material mixture layer formed on the negative electrode current collector,
the negative electrode material mixture layer includes the negative electrode active material,
a surface layer portion of the negative electrode includes (i) a lithium-containing oxide and a lithium-containing carbonate or (ii) a lithium nitride compound, and
the lithium compound is present in a region having a thickness of 0.1 to 3 μm from a surface of the negative electrode.

2. The negative electrode for a non-aqueous electrolyte secondary battery according to claim 1, wherein the $\Delta C$ is smaller than an irreversible capacity density.

3. The negative electrode for a non-aqueous electrolyte secondary battery according to claim 1, wherein the $\Delta C$ is larger than an irreversible capacity density.

4. The negative electrode for a non-aqueous electrolyte secondary battery according to claim 1, wherein the proportion y satisfies $0.03 \leq y \leq 0.15$.

5. The negative electrode for a non-aqueous electrolyte secondary battery according to claim 1, wherein the negative electrode active material is pre-doped with lithium.

6. A non-aqueous electrolyte secondary battery comprising:
the negative electrode according to claim 1;
a positive electrode capable of electrochemically absorbing and releasing lithium; and
a non-aqueous electrolyte.

* * * * *